United States Patent [19]

Griffis

[11] Patent Number: 4,820,319
[45] Date of Patent: Apr. 11, 1989

[54] REMOTE CONTROL AND MONITOR MEANS

[76] Inventor: Steven C. Griffis, 2929 Ave. D, Council Bluffs, Iowa 51501

[21] Appl. No.: 191,567

[22] Filed: May 9, 1988

Related U.S. Application Data

[63] Continuation-in-part of Ser. No. 72,044, Jul. 10, 1987, Pat. No. 4,750,922.

[51] Int. Cl.[4] .............................................. B01D 46/02
[52] U.S. Cl. ....................................... 55/213; 55/274; 55/471; 55/385.2
[58] Field of Search .................. 55/20, 163, 213, 274, 55/385 A, 471, 472, 500

[56] References Cited

U.S. PATENT DOCUMENTS

| | | | |
|---|---|---|---|
| 4,014,209 | 3/1977 | Emerick | 55/274 X |
| 4,604,111 | 8/1986 | Natale | 55/385 A X |
| 4,701,193 | 10/1987 | Robertson et al. | 55/274 X |
| 4,701,195 | 10/1987 | Rasendall | 55/385 A X |
| 4,702,753 | 10/1987 | Kowalczyk | 55/274 X |

Primary Examiner—Charles Hart
Attorney, Agent, or Firm—Zarley, McKee, Thomte Voorhees & Sease

[57] ABSTRACT

A remote control-monitor console is provided for controlling and monitoring air filtration units located within an enclosed work area in which an asbestos abatement action is taking place. A pressure differential sensor is associated with at least one of the air filtration units located within the enclosed work area and is operatively connected to the remote-control console to enable the condition of the filters in the air filtration unit to be monitored without the necessity of entering the contaminated work area. The air filtration unit may also be operated and controlled by the control-monitor console.

5 Claims, 4 Drawing Sheets

REMOTE CONTROL AND MONITOR MEANS

This is a continuation-in-part application of Ser. No. 72,044 filed July 10, 1987 and now U.S. Pat. No. 4,750,922.

BACKGROUND OF THE INVENTION

This invention relates to a remote control and monitor means and more particularly to a remote control and monitor means which is used to control and monitor an asbestos abatement action being conducted within an enclosed work area.

Airborne asbestos contamination in buildings is a significant environmental problem. Various diseases have been linked with industrial exposure to airborne asbestos, and the extensive use of asbestos products in buildings has raised concerns about exposure to asbestos in nonindustrial settings. Surveys conducted by the Environmental Protection Agency (EPA) estimate that asbestos-containing materials can be found in approximately 31,000 schools and 733,000 other public and commercial buildings in this country.

In an effort to avoid the hazards associated with exposure to airborne asbestos, abatement actions or procedures are being extensively conducted and the Environmental Protection Agency has published a booklet entitled "Guidance for Controlling Asbestos-Containing Materials in Buildings". During the abatement action, one or more air filtration units, usually several air filtration units, are positioned throughout the work site to filter the air in the work area.

During the abatement action, it is extremely important that the filter condition be monitored for each of the air filtration units located within the enclosed work area. Normally, the air filtration units are manually operated or controlled within the enclosed work area and it is necessary for the worker to go through the prescribed procedure for entering the work area and for leaving the same each time the worker enters the enclosed work area to either control the air filtration units or to monitor the condition of the filters therein.

In most asbestos abatement actions, it is necessary that a negative air pressure be maintained within the enclosed work area to ensure that asbestos fibers do not escape from the work area. Heretofore, it was extremely difficult, if not impossible, to determine whether negative air pressure does exist within the work area, and to document its existence.

It is therefore a principal object of the invention to provide a remote control for remotely controlling and monitoring the operation of air filtration units located within an enclosed work area wherein an asbestos abatement action is being conducted.

A further object of the invention is to provide a remote control-monitor means which has the ability to monitor the filter condition of the air filtration units located within an enclosed work area wherein an asbestos abatement action is being accomplished.

Still another object of the invention is to provide a remote control-monitor means for use in the described environment wherein means is provided for ascertaining whether the desired negative air pressure exists within the enclosed work area.

Still another object of the invention is to provide a device of the type described which includes an audio/visual alarm means for alerting workers to the fact that a filter in an air filtration unit has become clogged.

Still another object of the invention is to provide a device of the type described including an audio/visual alarm which indicates that the desired negative pressure has been lost within the enclosed work area.

These and other objects will be apparent to those skilled in the art.

SUMMARY OF THE INVENTION

A remote control-monitor console means is provided for controlling and monitoring air filtration units located within an enclosed work area in which an asbestos abatement action is taking place. A pressure differential sensing means is associated with at least one air filtration unit located in the enclosed work area and is operatively connected to the remote-control console to enable the condition of the filters in the air filtration unit to be monitored without the necessity of entering the contaminated work area. The air filtration unit may also be operated or controlled by the control-monitor console. Means is also provided to monitor the quality of the air within the work area.

DESCRIPTION OF THE PREFERRED EMBODIMENT

Figure 1:
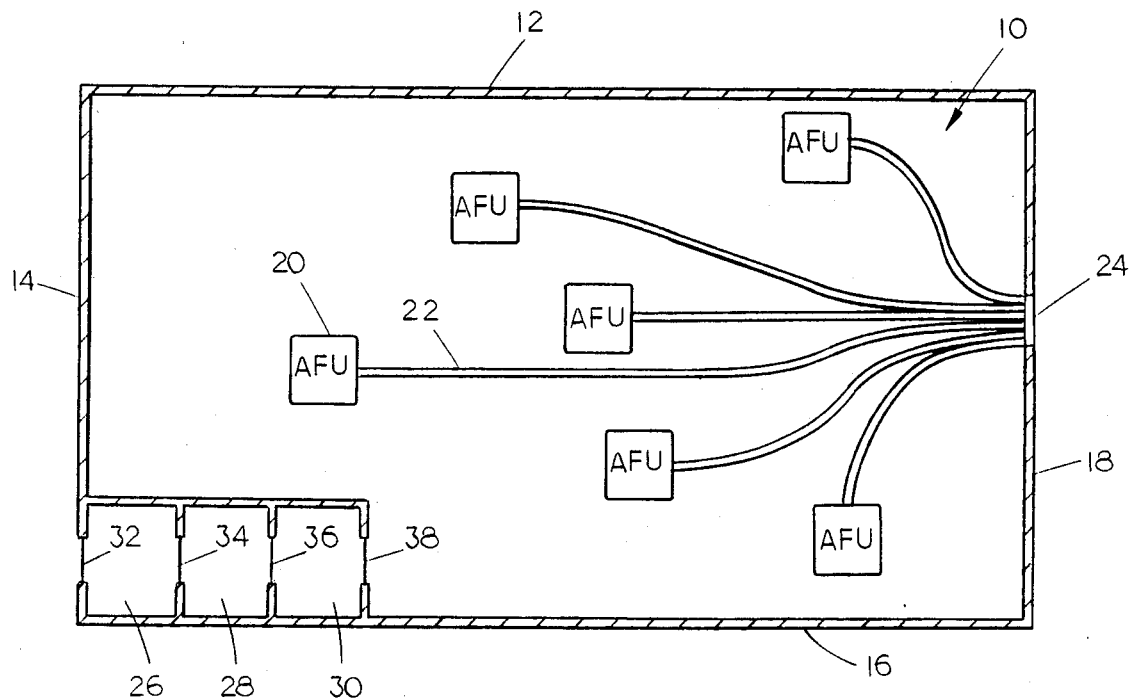
FIG. 1 is a schematic view of a conventional work site wherein an asbestos abatement action is being accomplished.
Figure 2:
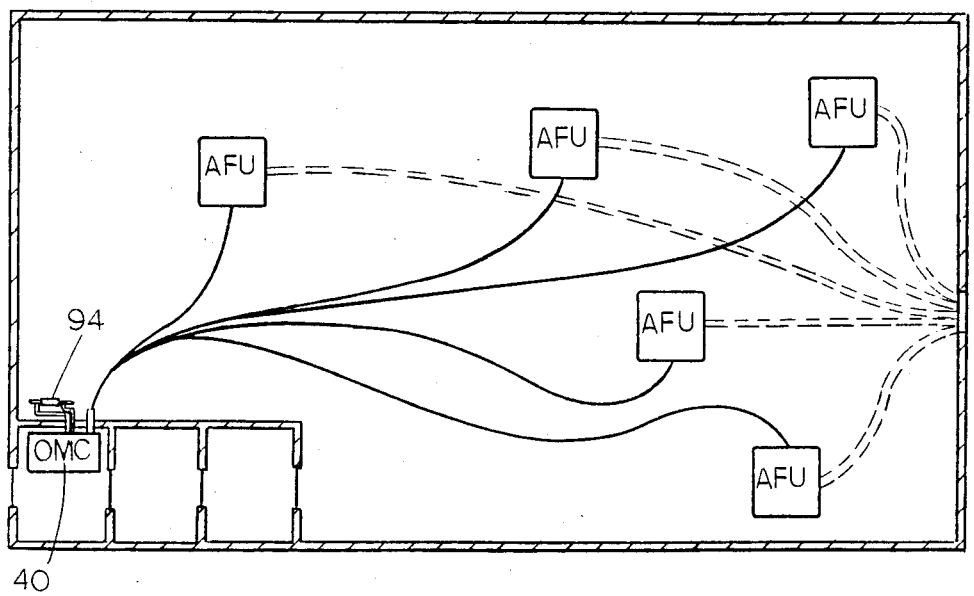
FIG. 2 is a schematic view similar to FIG. 1 except that the remote control-monitor console of this invention is being utilized to control the air filtration units and to monitor the condition of the filters therein.
Figure 3:
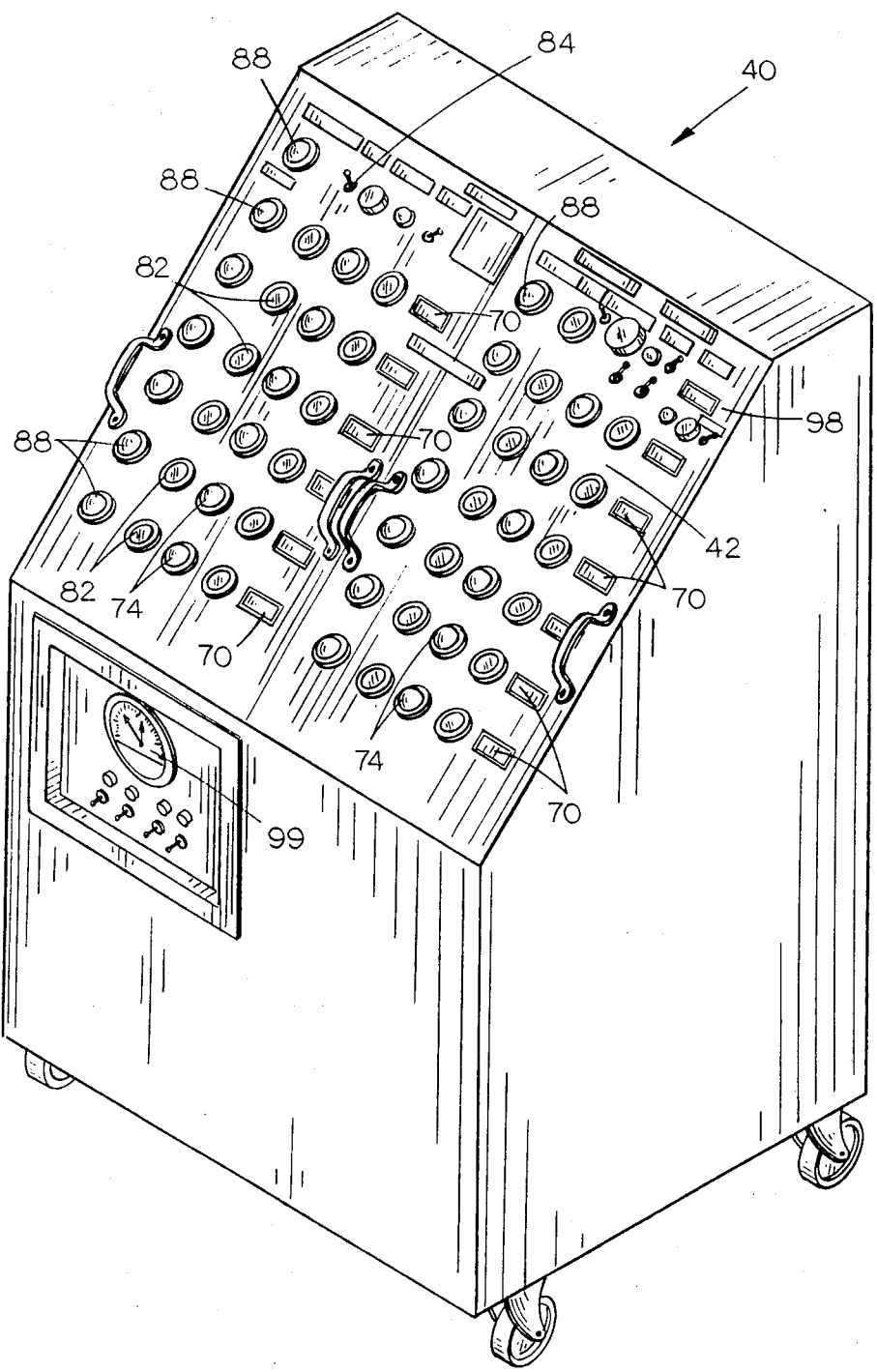
FIG. 3 is a perspective view of the remote control-monitor console.

In FIG. 1, the numeral 10 refers to an enclosed space or work area wherein an asbestos abatement action is taking place. Enclosed space 10 is defined by walls 12, 14, 16 and 18. A plurality of air filtration units 20 are mounted within the space 10 and have their exhausts operatively communicating with conduits 22 which extend to an exhaust outlet referred generally by the reference numeral 24. Air filtration units 20 are conventional in design except for the fact that they have a pressure differential device positioned therein as will be described in more detail hereinafter. In some situations, one or more of the units 20 may exhaust directly into the work area 10 rather than to an exhaust outlet. A conventional clean room 26, shower room 28 and equipment room 30 is provided having doors 32, 34, 36 and 38 provided therein. The doors 32, 34, 36 and 38 will normally consist of flexible plastic sheets or the like which permit air to flow from outside the work area 10 into work area 10 through the doors 32, 34, 36 and 38 but which will prevent the reverse flow of air therethrough. In the normal situation, the air filtration units 20 can only be controlled by entering the work site area 10 through the clean room 26, shower room 28 and equipment room 30 following the standard procedure for entering the work area 10. When the worker has activated the air filtration units 20, he leaves the area 10 through the equipment room 30, shower room 28 and clean room 26 while following the prescribed procedures.

Heretofore, the only way that the filters within the air filtration units 20 could be monitored was to actually enter the space 10 and determine the condition thereof. In most asbestos abatement actions, it is normally a requirement that there be some means for determining whether negative pressure does exist within the work area 10. Heretofore, certain types of portable units have been provided for monitoring negative pressure and for recording a strip chart, however, such devices are extremely sensitive and are not very durable. Further, to the best of applicant's knowledge, there is no means for determining whether the proper air flow does exist within the area 10 to prevent airborne fibers from escaping from the interior of the work space 10.

Figure 4:
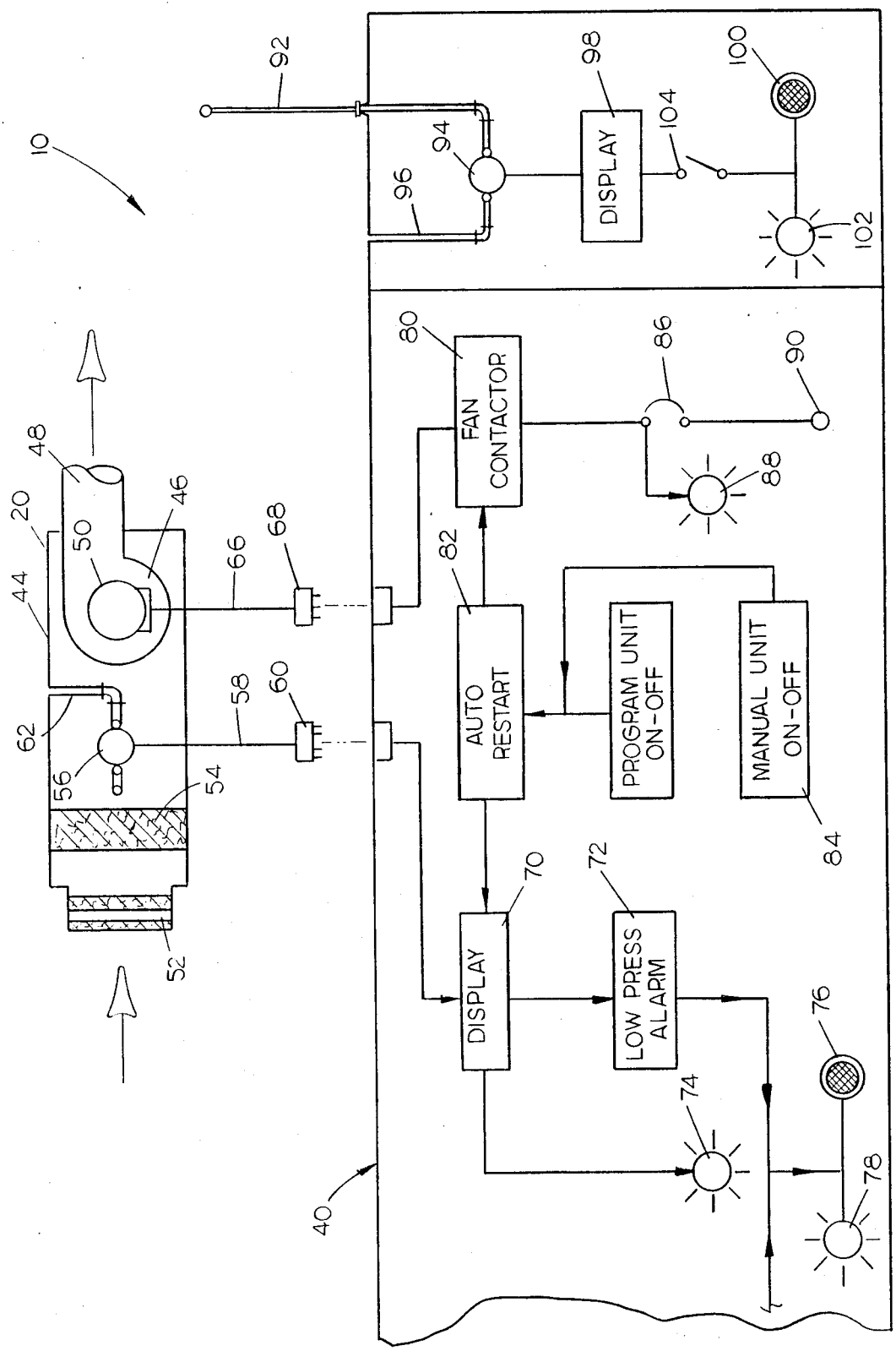
FIG. 4 is a partial schematic view illustrating the manner in which the remote control-monitor controls and monitors an air filtration unit and the manner in which the negative air pressure within the work area is monitored.
Figure 5:
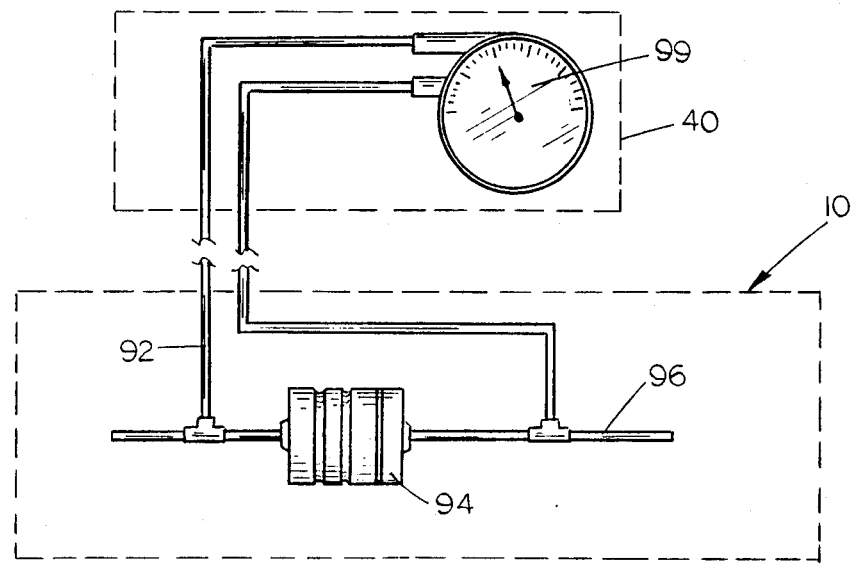
FIG. 5 is a schematic view illustrating the manner in which air may be sampled within the work site.
Figure 6:
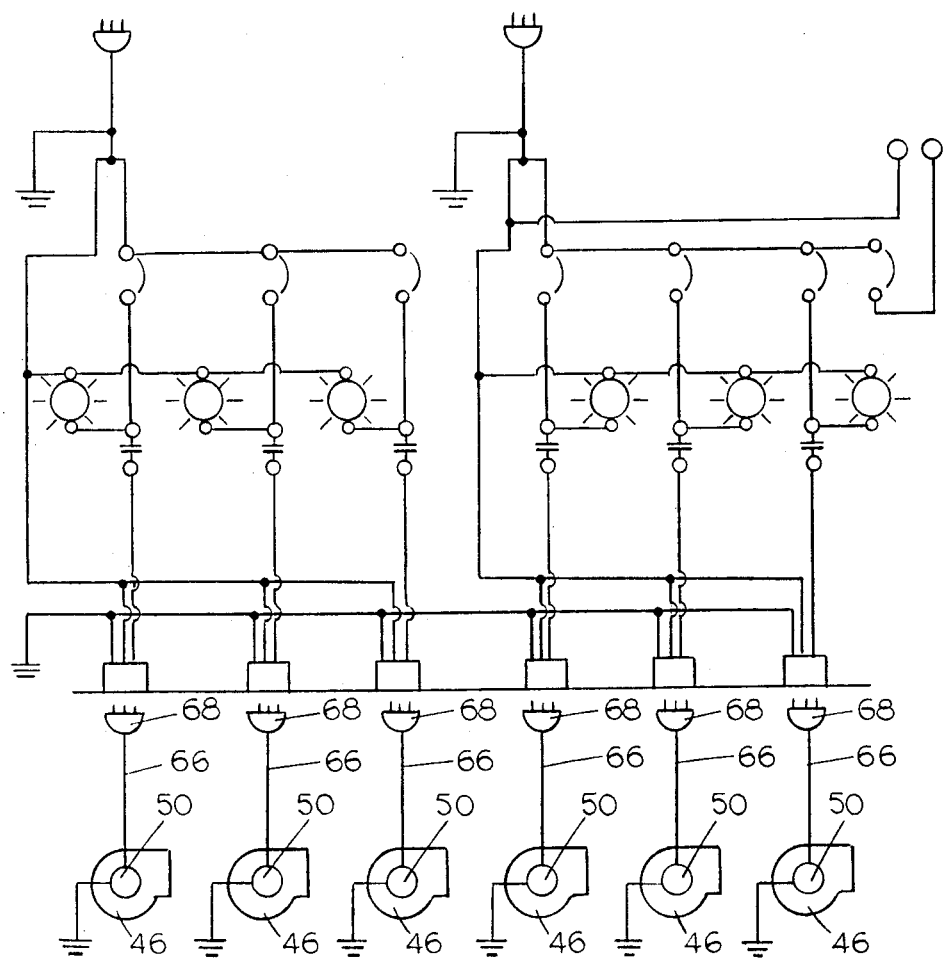
FIG. 6 is a schematic view illustrating a portion of the electrical circuitry of the invention.

To overcome the disadvantages of the prior art, a remote control-monitor console 40 has been devised. Console 40 includes a control panel 42 upon which all of the various switches, readouts, lights, etc. are mounted. The remote control-monitor console is designed to permit the control and monitoring of a plurality of the air filtration units 20 within the space 10. Inasmuch as the control and monitoring of all of the air filtration units is identical, only the relationship between one of the air filtration units and the console is illustrated in FIG. 4. Air filtration unit 20 includes a housing or cabinet 44 in which a blower fan 46 is mounted having an exhaust 48 extending therefrom. Exhaust 48 may either communicate with the exhaust outlet 24 or with the interior of work area 10. Blower fan 46 is controlled by an electric motor 50 and is designed to draw air inwardly into the cabinet 44 through the pre-filter 52, secondary filter (not shown) and the absolute filter 54 which will normally be of the HEPA type. The numeral 56 refers to a differential pressure transmitter such as the Modus Model T-30 pressure transmitter distributed by Kele & Associates, P.O. Box 34817, Bartlett, Tenn. 38184. The pressure transmitter 56 operates on the capacitance principle and is capable of sensing very low differential pressures. In the capacitance cell, a very lightweight, responsive diaphragm deflects a small amount when pressure is applied. This deflection results in a change in capacitance which is then detected and processed electronically. Lead 58 extends from the pressure transmitter 56 to a jack 60 which is plugged into the console 40. As seen in FIG. 4, one side of the pressure transmitter 56 is in communication with the interior of the cabinet 44 directly behind the filter 54. The other side of the pressure transmitter 56 is in communication with the interior of the work space 10 through pipe or tube 62. As also seen in FIG. 4, motor 50 of blower fan 46 has leads 66 extending therefrom terminating in a plug 68 which may be plugged into the remote control-monitor console. As seen in FIG. 4, remote control-monitor console 40 includes a digital readout display 70 which displays the reading from the pressure transmitter 56. A low pressure alarm 72 is also provided which will be activated when the display 70 reaches a lower predetermined limit. Light 74 indicates that the fan is running while audio alarm 76 is activated if blower fan 46 should inadvertently shut down. Light 78 also indicates that the blower fan 46 has shut down.

As also seen in FIG. 4, fan contactor 80, automatic restart 82, manual switch 84, circuit breaker 86 and light 88 are provided. Switch 90 controls the operation of the blower fan 46.

In order to determine whether the desired negative pressure exists within the work space 10, pipe or tube 92 extends from work area 10 into the interior of console 40 where it is connected to the low side of a pressure transmitter 94 which is identical to transmitter 56. The high side of pressure transmitter 94 communicates with the atmosphere within the clean room 26 by means of a pipe or hose 96. Pressure transmitter 94 is connected to digital readout display 98 and to a photohelic gauge 99 located on the console 40 which indicates the status of the negative air pressure within the space 10. An audio alarm 100 and light 102 (see FIG. 4) are provided which are also activated when the negative air pressure within space 10 reaches a predetermined level as sensed by the pressure transmitter 94. Switch 104 is provided to deactivate the light 102 and audio alarm 100.

The remote-control monitor may be used to control and monitor any number of air filtration units within the work area without actually entering the work area. Further, the remote-control monitor means of this invention permits the air within the work area to be monitored as well as the pressure differential therein. Thus is can be seen that this invention accomplishes at least all of its stated objectives.

I claim:

1. In combination,
an enclosed work area in which an asbestos abatement action is taking place,
at least one air filtration unit in said enclosed space and having an intake end, a discharge end, a filter means positioned therebetween, and a powered blower fan means for pulling air therethrough,
a pressure differential sensing means in said air filtration unit for sensing the pressure differential between the intake and discharge sides of said filter means,
a remote control-monitor console means located remotely of said work area,
said console means having a first readout means for indicating the said pressure differential,
and first means operatively connecting said pressure differential sensing means and said first readout means whereby the condition of said filter means may be monitored at said console means without entering said work area.

2. The combination of claim 1 wherein said console means has a blower fan control means associated therewith for controlling the operation of said blower fan means, and second means operatively connecting said blower fan means and said blower fan control means whereby the operation of said blower fan means may be controlled from said console means.

3. The combination of claim 2 wherein a plurality of air filtration units having pressure differential sensing means provided therein are positioned in said work area and wherein said console is provided with a plurality of readout means for monitoring the condition of the various filters and wherein said console is provided with a plurality of control means for controlling the operation of the various air filtration units.

4. The combination of claim 2 wherein said work area is maintained in a negative pressure condition and wherein a pressure monitoring means is provided for monitoring the pressure within said work area, said console means having a display means which indicates the monitored pressure within said work area.

5. In combination, an enclosed work area in which an asbestos abatement action is taking place, at least one air filtration unit in said enclosed space and having an intake end, a discharge end, a filter means positioned therebetween, and a powered blower fan means for pulling air therethrough, a remote control-monitor console means located remotely of said work area, and means operatively connecting said air filtration unit in said enclosed space and said remote control-monitor console means whereby the operation of said air filtration unit may be monitored and controlled at said console means without entering said work area.

* * * * *